US009875820B2

(12) United States Patent
Donaldson et al.

(10) Patent No.: US 9,875,820 B2
(45) Date of Patent: Jan. 23, 2018

(54) RADIATION SOURCE CONTAINER

(71) Applicant: JOHNSON MATTHEY PUBLIC LIMITED COMPANY, London (GB)

(72) Inventors: Peter Donaldson, Durham (GB); Emanuele Ronchi, Cleveland (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 14/898,754

(22) PCT Filed: Jun. 17, 2014

(86) PCT No.: PCT/GB2014/051862
§ 371 (c)(1),
(2) Date: Dec. 16, 2015

(87) PCT Pub. No.: WO2014/202969
PCT Pub. Date: Dec. 24, 2014

(65) Prior Publication Data

US 2016/0141064 A1 May 19, 2016

(30) Foreign Application Priority Data

Jun. 19, 2013 (GB) .................................. 1310924.4

(51) Int. Cl.
*G01F 23/00* (2006.01)
*G21K 1/04* (2006.01)
(Continued)

(52) U.S. Cl.
CPC ............... *G21K 1/04* (2013.01); *G21F 5/015* (2013.01); *G21F 5/02* (2013.01); *G21G 4/02* (2013.01); *G21G 4/06* (2013.01); *H05G 1/04* (2013.01)

(58) Field of Classification Search
CPC . G21F 5/015; G21F 5/02; G21F 1/125; G21F 3/04; G21K 1/04; G21K 5/00; G21G 4/06; G21G 4/02; H05G 1/04
(Continued)

(56) References Cited

U.S. PATENT DOCUMENTS 2,670,443 A * 2/1954 Pennock ................... G21F 5/02 250/396 R
2,772,361 A * 11/1956 Hiestand ................... G21F 5/02 250/497.1
(Continued)

FOREIGN PATENT DOCUMENTS

FR 2 409 583 A1 6/1979
TW 200805399 A 1/2008
WO 2012/168054 A2 12/2012

OTHER PUBLICATIONS

International Search Report, dated Sep. 26, 2014, from corresponding PCT application.
(Continued)

*Primary Examiner* — Taeho Jo
(74) *Attorney, Agent, or Firm* — Baker & Hostetler LLP

(57) ABSTRACT

A source container for a radiation source includes a vessel having an external wall defining a space within which is located a shield formed from a radiation absorbing material and defining a cavity for receiving a radiation source, the shield including a window extending from the cavity through the radiation absorbing material, and at least two shutters, each shutter being movable between a closed position in which the shutter covers the window and an open position in which the shutter does not cover the window. The provision of two or more shutters provides a way to emit radiation of different intensities from the same source and container.

16 Claims, 2 Drawing Sheets

(51) Int. Cl.

| | |
|---|---|
| ***G21F 5/015*** | (2006.01) |
| ***G21F 5/02*** | (2006.01) |
| ***G21G 4/06*** | (2006.01) |
| ***G21G 4/02*** | (2006.01) |
| *H05G 1/04* | (2006.01) |

(58) Field of Classification Search
USPC ........................................................ 250/358.1
See application file for complete search history.

(56) References Cited

U.S. PATENT DOCUMENTS

| | | | | | |
|---|---|---|---|---|---|
| 2,858,450 | A * | 10/1958 | Holben | G21K 1/04 | 246/DIG. 1 |
| 3,141,976 | A * | 7/1964 | MacIntyre | A61N 5/10 | 250/498.1 |
| 3,165,448 | A * | 1/1965 | McCorkle | G21C 1/30 | 376/224 |
| 3,177,364 | A * | 4/1965 | Green | G03B 9/08 | 250/498.1 |
| 3,183,354 | A * | 5/1965 | Amrehn | G01N 23/00 | 378/56 |
| 3,197,639 | A * | 7/1965 | Stone | G21F 5/02 | 250/497.1 |
| 3,560,748 | A * | 2/1971 | Hatten | G01N 23/16 | 220/89.4 |
| 3,796,873 | A * | 3/1974 | Ledgett | G01G 9/00 | 177/1 |
| 4,071,771 | A * | 1/1978 | Covic | A61B 6/06 | 378/160 |
| 4,751,021 | A * | 6/1988 | Mollon | G21F 1/08 | 250/518.1 |
| 5,063,298 | A * | 11/1991 | Freitas, Jr. | G21F 5/02 | 250/496.1 |
| 7,046,768 | B1 * | 5/2006 | Gilevich | G21K 1/04 | 250/505.1 |
| 8,545,377 | B2 * | 10/2013 | Hentrich | A61N 5/1007 | 206/538 |
| 2002/0039186 | A1 * | 4/2002 | Rosenberg | G01J 3/02 | 356/432 |
| 2006/0220919 | A1 * | 10/2006 | Pitts, Jr. | G08B 21/0269 | 340/963 |
| 2006/0228262 | A1 * | 10/2006 | Jacobs | G01N 35/1002 | 422/562 |
| 2009/0175412 | A1 * | 7/2009 | Grodzins | G01N 23/04 | 378/57 |
| 2009/0194713 | A1 * | 8/2009 | Stichelbaut | G21F 3/00 | 250/515.1 |
| 2010/0224800 | A1 * | 9/2010 | Nishikawa | G21F 5/015 | 250/506.1 |
| 2012/0326035 | A1 * | 12/2012 | Saze | A61N 5/1048 | 250/336.1 |
| 2013/0013242 | A1 * | 1/2013 | Joyce | G01N 23/087 | 702/100 |

OTHER PUBLICATIONS

Great Britain Patent Application No. GB1410804.7: Patents Act 1977 Combined Search and Examination Report under Sections 17 & 18(3) dated Dec. 18, 2014, 6 pages.

Great Britain Patent Application No. GB1310924.4: Patents Act 1977: Search Report under Section 17(5) dated Dec. 3, 2013, 3 pages.

* cited by examiner

RADIATION SOURCE CONTAINER

The present invention concerns a container for housing a radiation source.

Radiation sources are used in a variety of commercial instruments. Scanning and measurement of large industrial structures may require the use of relatively energetic radiation sources, which emit X-rays or gamma radiation or beta particles. Particularly when larger sources are used, the safe containment of the source during transport and use presents problems. Although it is possible to enclose a source completely within a shielded container, the transfer of the source to an instrument in which it is used and the subsequent controlled release of radiation from the source for use in such instruments presents technical challenges. Various designs of radiation source container have been proposed and made available. For example, WO2012/168054 describes a shielded container having a chamber for receiving a radiation source and a rotational mechanism for moving the source to a position in which the radiation may be emitted from the container along a pre-determined path. U.S. Pat. No. 4,071,771 describes a housing having a rotary shutter mechanism for an X-ray scanner, providing a position in which radiation is blocked from emission from the housing and a position in which the radiation may be emitted. It is an object of the invention to provide an improved source container.

A source container for a radiation source comprises a vessel having an external wall defining a space within which is located a shield formed from a radiation absorbing material and defining a cavity for receiving a radiation source, said shield including a transmission window extending from said cavity through said radiation absorbing material, and at least two shutters, each shutter being capable of preventing transmission of at least some radiation emitted by said source through the shutter, each shutter being movable between a closed position in which said shutter covers said window and an open position in which said shutter does not cover said window and said shutters being operable to produce an operational condition in which at least one shutter is closed and at least one shutter is open.

When at least one shutter is closed and at least one shutter is open, the amount of radiation transmitted or emitted from the container through the window is intermediate between the amount of radiation transmitted or emitted when all of the shutters are closed (minimum radiation) and the amount of radiation transmitted or emitted when all of the shutters are open (maximum radiation).

The container of the invention therefore provides a means to emit radiation of different intensities from the same source and container. When all (or both) of the shutters are closed, the radiation emitted from the container is minimised. When all (or both) of the shutters are open, the maximum amount of radiation is emitted from the container. When at least one shutter is closed and at least one shutter is open, an amount of radiation which is intermediate between the minimum and maximum amounts is emitted from the container, some of the radiation emitted by the source being absorbed by the closed shutter(s). When the source container of the present invention in which, for example, two shutters are present, is used to house a radiation source within the cavity, the operator may open only one shutter and thereby release an intermediate amount of radiation from the container because some of the radiation emitted by the source is absorbed by the other shutter. The source container may be useful for housing a source of radiation which is used in a measuring instrument or measuring system. Measuring systems and instruments utilising radiation are well known, e.g. for measuring levels of material within a container. Such systems or instruments may use ionising radiation at an intensity which is hazardous to personnel. When the radiation source is housed within a source container according to the invention, it is possible to perform tests or calibration procedures by positioning the source and the source container in a measuring system without releasing radiation of the intensity required for the actual operation of the measuring system. This may be particularly useful where calibration operations are carried out in the absence of a mass of material which would, if present absorb some of the radiation from the source and which is to be measured during normal operation of the instrument. In this way such testing or calibration may be carried out more safely, and may reduce the potential exposure of personnel to said radiation. More than two shutters may be provided and in such cases more than three intensities of radiation (i.e. minimum, maximum and at least one intermediate intensity) may be produced using the same source and container. A further benefit of the container of the invention is that the source may remain in the same position during calibration and operation so that subsequent operation of the instrument is not affected by moving a source into or out of a shielding material.

The cavity is used to house a source of radiation. The source of radiation may be a source of ionising radiation. The source may be a source of gamma radiation, X-rays, beta particles or neutrons. In a particular embodiment of the invention, the source is a source of gamma radiation. Radiation sources are widely used in industrial instruments and the skilled person can select a suitable source depending on the purpose for which it is required. The source container of the present invention is particularly suitable for use with large energetic sources of the type required for measuring through the walls of industrial plant, which is often constructed of relatively thick, pressure resistant materials such as steel. For example, the source container is useful for sources >500 mCi (18.5 GBq), especially sources >about 10 Ci (370 GBq), particularly about 20 Ci (740 GBq).

The shield is formed from a radiation absorbing material, preferably a material such as lead, tungsten or a known heavy alloy of the type known for use in radiation-shielding applications. Such materials are well known for absorbing radiation and are usually highly dense metals and alloys. The thickness of the shield surrounding the cavity depends on the type of radiation which is to be absorbed and the density of the radiation-absorbing material.

Normally the shield material and thickness is selected to provide sufficient absorption of the radiation emitted from a source located within the cavity that the radiation detected in the vicinity of the container (when the shutters are closed) is not significantly higher than a specified amount, which amount may be equivalent to an acceptable amount of background radiation and/or as specified in the applicable industry and regulatory standards.

The shield may be formed from a single unit or may be constructed from more than one component. In a preferred embodiment, the shield is formed from different shaped parts which are fixed together to form the shield. For example the shield may comprise top and bottom pieces and one or more side wall pieces which may be joined, for example by mechanical bolts, to form the shield. Forming a shield from more than one component in this way provides benefits in manufacturing, particularly as the shield is usually formed from very dense metals. The shield may include an opening through which the radiation source may be introduced into the cavity. The opening may, for example, comprise a channel which is sized to receive a rod having a source mounted at or near an end thereof, which may be a distal end, and which can be secured in place at its proximal end external to the shielding. In this arrangement, the rod is formed from a radiation absorbing material which may or may not be different from the material forming the shield and shutters. The rod and channel may be shaped to reduce or eliminate linear gaps between the rod and shield along which radiation may pass. Suitable designs are known and include threaded and helically-shaped rods and channels. A gasket may be present to seal the container from ingress of fluids through the opening. The gasket may, for example, comprise one or more "O" rings. The gasket may be designed to withstand pressure. For example if the source container is designed to be used underwater, The gasket and other sealing means, if present, may be designed to withstand the ingress of water into the container when subjected to the hydrostatic pressures encountered in its designed use. The rod may be secured in the container by securing means, such as, for example, a thread which engages a cooperating thread on the container, by bolts or otherwise.

When the container includes an opening for insertion of a radiation source, for example a source mounted on a rod, a cap may be provided to cover the portion of the external wall in which the opening is located. The function of such a cap is to protect the container from ingress of materials into the container. The cap may also prevent or deter the removal of the source from the container. The cap may be removable and/or replaceable. The cap may include means to indicate whether it has been removed or otherwise tampered with. The cap may engage with the external wall by means of fixings such as bolts, screws, rivets etc. The cap may engage with the external wall of the container by means of cooperating portions on the cap and the external wall of the container. Such cooperating portions may include a flange. The cooperating portions may include threaded portions on the cap and the container wall. A gasket may be present to seal the container from ingress of fluids between the cap and the wall of the container. The cap may be removed for inspection, for example to determine whether water or another fluid may have entered the container.

The term "window" or "transmission window" is not intended to be restricted to optical windows, although the window may be capable of transmitting optical light. The term "window" is used to indicate a portion of the container through which radiation emitted by the source may pass from the cavity towards the external wall of the container. The window may include materials which are more transparent to the radiation emitted by the source than the radiation-absorbing material forming the shield or the shutters. The window may comprise a portion of the container between the cavity and the external wall in which there is an absence of radiation absorbing material. The window in the shield allows radiation to be emitted from the source container along a path defined by the position, size and shape of the window. The window therefore collimates the beam of radiation emitted from the container. The window may be shaped to provide a narrow beam or a wider beam. Although all radiation beams tend to spread, the window may be shaped to provide a fan or cone-shaped beam if required. More than one window may be provided, but usually there is a single window. The window may, in some embodiments, be used for transferring the radiation source into the cavity.

The shutters are formed from radiation-absorbing material which may be the same as or different from the material forming the shield. Each shutter is independently movable between a closed position in which said shutter covers said window and an open position in which said shutter does not cover said window. Each of the shutters may be moved between the open and closed positions by sliding, hinging, folding, rotating or in other ways. A sliding shutter is preferred because it offers a simple and compact movement means. Any one or all of the shutters may engage with parts of the shield surrounding the window by means of channels along which the shutter may be moved between open and closed positions. The channels may be formed in the shield or in the shutter, with a corresponding portion of the shield or shutter being arranged to engage with the channel to allow sliding movement. The operation of any or each of the shutters to move between open and closed positions may be controlled by motor or by simple mechanical means such as springs, levers or cams. The mechanism for moving the shutters is preferably biased to close the shutters in the event of failure. The mechanism may be operable remotely. Remote operation may be controlled by a wireless communication means, and in such a case, the source container further comprises at least a receiver for such means. Remote operation may also be achieved by operation of a remotely operated vehicle (ROV). In that case the ROV and the source container include cooperating means by which the movement of the shutters between closed and open positions may be operated by the ROV. The mechanism may include an interlock or security system in order to control access for opening the shutters to prevent unintentional operation or operation by unauthorised personnel.

The external wall of the source container of the invention may be made from a material which can resist handling, impact and which can protect the internal materials from damage. The external wall of the container may absorb some radiation emitted by the source. Usually the material of the external wall of the container allows sufficient transmission through the wall so that a useful amount of radiation may be emitted from the source container when one or more of the shutters are open. Suitably the external wall of the container is formed from a metal, particularly steel or aluminium which may be in sheet form or machined from a solid billet. The material may be coated or covered, for example by a paint or polymeric layer to provide additional protection, colour and signage, antislip, antistatic, anticorrosion, liquid resistance or other properties to the container. Means for locating the source container in a system where it is to be used may also be provided. Such means may take the form of a bracket, socket, flange or similar means attached to the external wall of the container. Handling means may also be provided.

We also provide, according to the invention a method of measuring a property of an object with a nucleonic instrument, said instrument comprising a source of ionising radiation and one or more radiation detectors capable of detecting said ionising radiation, wherein the source and detector(s) are arranged such that radiation from the source is caused to interact with the object and the radiation detectors are caused to detect said radiation after it has interacted with the object; characterised in that said source is located within a source container according to the invention, i.e. a source container for a radiation source comprising a vessel having an external wall defining a space within which is located a shield formed from a radiation absorbing material and defining a cavity for receiving a radiation source, said shield including a transmission window extending from said cavity through said radiation absorbing material, and at least two shutters, each shutter being capable of preventing transmission of at least some radiation emitted by said source through the shutter, each shutter being movable between a closed position in which said shutter covers said window and an open position in which said shutter does not cover said window and said shutters being operable to produce an operational condition in which at least one shutter is closed and at least one shutter is open.

The instrument may be subjected to a calibration operation. During calibration, at least one of the shutters may be closed and at least one of the shutters may be open during so that an amount, or intensity, of radiation which is intermediate between the minimum and maximum amount of radiation may be emitted from the source container. In this way, the calibration operation may be carried out in a manner which avoids the use of the maximum amount of radiation, so that the calibration may be carried out more safely in the presence of operating personnel. When the instrument is operated to measure of the property of the object, more of said shutters may be in the open position during said measuring operation than during said calibration operation.

An embodiment of the invention will be further described with reference to the accompanying drawings.

Figure 3:
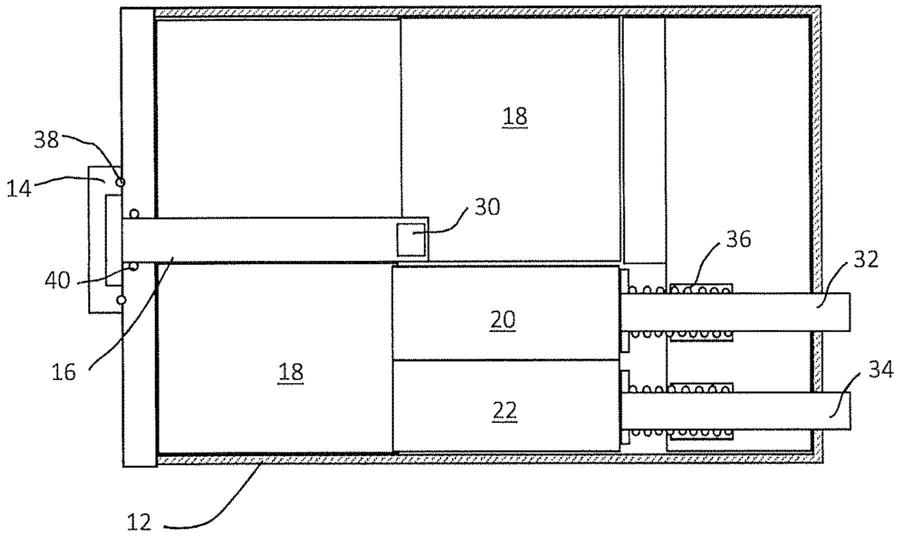
Figure 4:
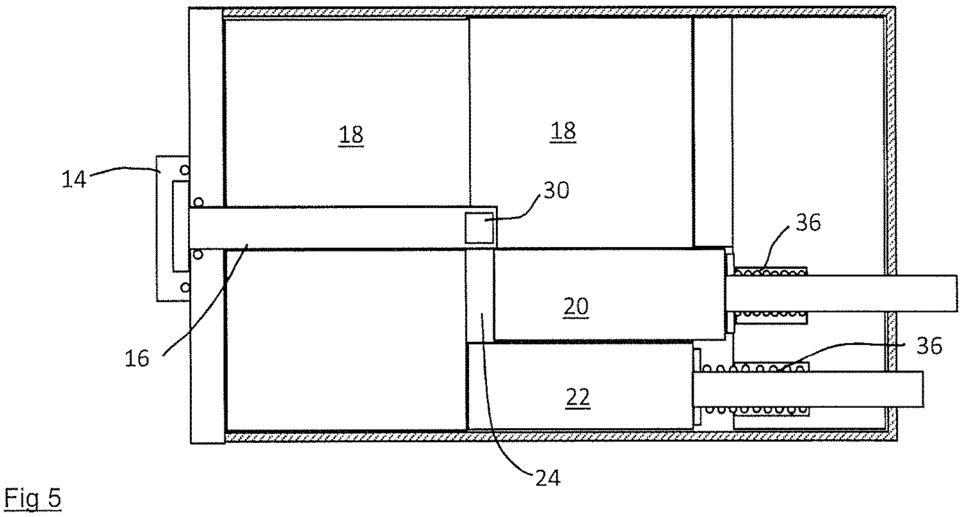
Figure 5:
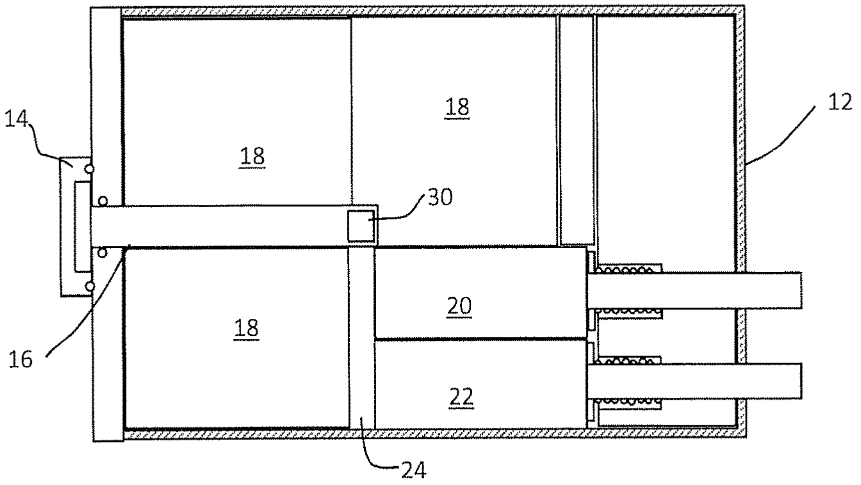

FIGS. 3-5 each show a longitudinal section through a source container of the invention.

Figure 1:
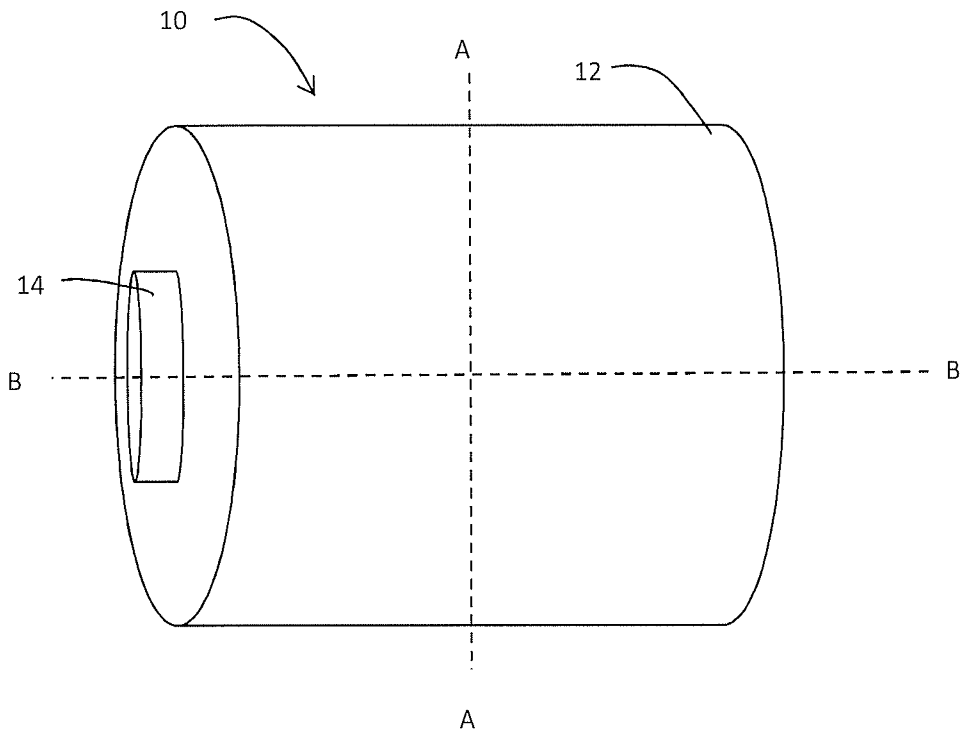
FIG. 1 is a schematic view of a source container.
Figure 2:
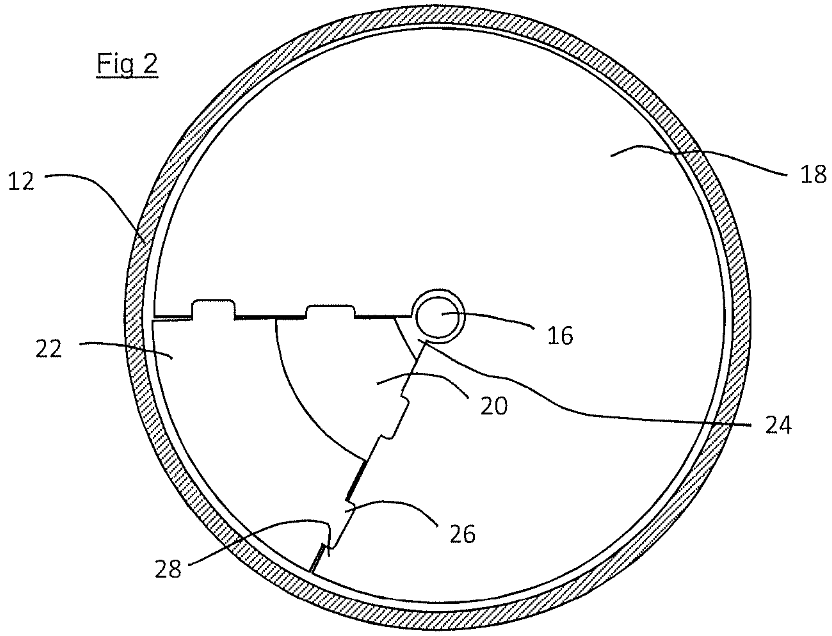
FIG. 2 shows a transverse section through a source container of the invention.

FIG. 1 shows a radiation source container 10 according to the invention. In this embodiment, the container is cylindrical and has an external shell 12 made from aluminium. The cover 14 of the source holder 16 is located at one end of the container. FIG. 2 is a representation of a section through the container along line A. The source holder 16 is located approximately centrally within the container. Shielding material 18, formed from a radiation-absorbing heavy alloy, is positioned between the source holder and the external shell. A primary shutter 20 and a secondary shutter 22, also of heavy alloy, are arranged to cover and close an opening 24 in the shielding 18. The shutters 20, 22 are arranged to be movable in the direction of the axis of the cylindrical container and are provided with tongues 26 which are sized and positioned to engage with channels 28 formed in the shield 18, thereby to guide movement of the shutters relative to the shield.

FIGS. 3-5 show a representation of a longitudinal section through the cylindrical container 10. The source is mounted at the end of rod 16, which is secured in place by threads (not shown) engaging a channel through the end wall of the shell. O ring 40 prevents fluid from entering into the container through the opening into which the rod 16 is secured. The cover, or cap, 14 is secured over the end of rod 16 by means of screws (not shown) and an O ring 38 further protects from fluids which may otherwise enter the container between the cap and the end wall. In FIG. 3, both shutters 20, 22 are closed and cover the opening 24 in the shielding material. In this position the maximum amount of radiation from the source 30 is absorbed by the shutters. The shutters may be operated by means of shafts 32, 34 and are biased to their closed position by compression springs 36. FIG. 4 shows the container with the primary shutter open and the secondary shutter closed. In this configuration, some radiation emitted by source 30 is absorbed by shutter 22 whilst a proportion of the radiation is transmitted from the container along opening 24. The relative proportions of the shutters are designed such that the amount of radiation leaving the container in this configuration is sufficient for a particular purpose, such as a calibration operation. In FIG. 5, the container is shown with both shutters open so that the maximum amount of radiation is transmitted from container 10. This configuration may be used when the source is used in the operation for which it is designed, such as in a measuring operation requiring the maximum penetration of the radiation.

The invention claimed is:

1. A source container for a source of ionizing radiation for a measuring instrument or measuring system, the source container comprising:

a vessel having an external wall defining a space within which is located a shield formed from a radiation absorbing material, said shield defining a cavity for receiving a source of ionizing radiation, a single transmission window extending from said cavity through said radiation absorbing material and to the external wall, and at least two shutters positioned in line with the single transmission window, each shutter being capable of preventing transmission of at least some radiation emitted by said source through the shutter, each shutter being movable between a closed position in which said shutter covers said transmission window and an open position in which said shutter does not cover said transmission window, and said shutters being operable to produce an operational condition in which all of the at least two shutters are closed, all of the at least two shutters are open, or at least one shutter is closed and at least one shutter is open, wherein a minimum amount of radiation is transmitted or emitted from the container through the transmission window when all of the at least two shutters are closed;

a maximum amount of radiation is transmitted or emitted from the container through the transmission window when all of the at least two shutters are open; and an amount of radiation which is intermediate between the minimum and maximum amounts is transmitted or emitted from the container through the transmission window when at least one shutter is closed and at least one shutter is open.

2. The source container as claimed in claim 1, wherein the source is a source of gamma radiation, X-rays, beta particles or neutrons.

3. The source container as claimed in claim 1, wherein the source is >about 10 Ci (370 GBq).

4. The source container as claimed in claim 1, wherein the external wall of the container is formed from steel or aluminium.

5. The source container as claimed in claim 1, wherein the at least two shutters are movable between the open and closed positions by sliding, hinging, folding or rotating.

6. The source container as claimed in claim 1, wherein the at least two shutters engage with parts of the shield surrounding the window by means of at least one channel along which the shutter may be moved between open and closed positions.

7. The source container as claimed in claim 1, wherein the movement of at least one shutter between open and closed positions is controlled by a motor.

8. The source container as claimed in claim 1, wherein the movement of the at least two shutters between open and closed positions is controlled by a spring, a lever or a cam.

9. The source container as claimed in claim 1, wherein the at least two shutters are biased towards the closed position.

10. The source container as claimed in claim 1, wherein the movement of at least one shutter between open and closed positions is operable remotely.

11. The source container as claimed in claim 1, further comprising an interlock to control the movement of the at least two shutters between open and closed positions.

12. The source container as claimed in claim 1, wherein the movement of each of the at least two shutters between open and closed positions is controlled by a spring and each of the at least two shutters are biased towards the closed position, and wherein the movement of the at least two shutters between the open and closed positions occurs by sliding in an axial direction with respect to container.

13. A method of measuring a property of an object with a nucleonic instrument, said instrument comprising a source of ionising radiation and one or more radiation detectors capable of detecting said ionising radiation, wherein the source and detector(s) are arranged such that radiation from the source is caused to interact with the object and the radiation detectors are caused to detect said radiation after it has interacted with the object; and wherein said source is located within the source container as claimed in claim 1.

14. The method as claimed in claim 13, wherein said instrument is subjected to a calibration operation and at least one of the shutters is closed and at least one of the shutters is open during said calibration operation.

15. The method as claimed in claim 14, wherein said instrument is operated to perform the measuring of the property of the object and wherein more of said shutters are in the open position during said measuring operation than during said calibration operation.

16. The method as claimed in claim 13, wherein the source is a source of gamma radiation, X-rays, beta particles or neutrons.

* * * * *